(12) United States Patent
Uchino

(10) Patent No.: US 8,146,987 B2
(45) Date of Patent: Apr. 3, 2012

(54) FENDER LINER STRUCTURE

(75) Inventor: Keiichi Uchino, Kariya (JP)

(73) Assignee: Toyota Shatai Kabushiki Kaisha, Aichi-Ken (JP)

( * ) Notice: Subject to any disclaimer, the term of this patent is extended or adjusted under 35 U.S.C. 154(b) by 478 days.

(21) Appl. No.: 12/516,532

(22) PCT Filed: May 20, 2008

(86) PCT No.: PCT/JP2008/059219
§ 371 (c)(1),
(2), (4) Date: Jul. 8, 2009

(87) PCT Pub. No.: WO2009/016877
PCT Pub. Date: Feb. 5, 2009

(65) Prior Publication Data
US 2010/0090503 A1    Apr. 15, 2010

(30) Foreign Application Priority Data
Aug. 2, 2007  (JP) .................................. 2007-201785

(51) Int. Cl.
*B60J 7/00*  (2006.01)
(52) U.S. Cl. ........................................................ 296/198
(58) Field of Classification Search .................. 296/198, 296/193.11, 39.1
See application file for complete search history.

(56) References Cited

U.S. PATENT DOCUMENTS

| | | | | |
|---|---|---|---|---|
| 4,549,762 A * | 10/1985 | Burk et al. | ..................... | 296/208 |
| 5,100,177 A * | 3/1992 | Becker | ......................... | 280/851 |
| 5,460,411 A * | 10/1995 | Becker | ......................... | 280/851 |
| D372,449 S * | 8/1996 | Becker | ......................... | D12/184 |
| 6,155,624 A * | 12/2000 | Bienenstein, Jr. | ........... | 296/37.1 |
| 6,799,782 B2 * | 10/2004 | Jain et al. | ...................... | 280/848 |
| 7,497,509 B2 * | 3/2009 | Omiya et al. | ................. | 296/198 |
| 7,810,828 B2 * | 10/2010 | Sugiyama et al. | ....... | 280/152.05 |
| 7,832,751 B2 * | 11/2010 | Fischer et al. | ................ | 280/154 |
| 7,914,046 B2 * | 3/2011 | Iverson | ......................... | 280/848 |
| 2007/0216199 A1 * | 9/2007 | Ito et al. | ........................ | 296/198 |
| 2008/0231082 A1 * | 9/2008 | Mathew | ........................ | 296/198 |
| 2009/0256345 A1 * | 10/2009 | Tanaka et al. | ................ | 280/850 |
| 2010/0078927 A1 * | 4/2010 | Takeuchi | ...................... | 280/851 |

FOREIGN PATENT DOCUMENTS

| | | |
|---|---|---|
| JP | 5-76970 | 10/1993 |
| JP | 9-88750 A | 3/1997 |
| JP | 2003-54451 A | 2/2003 |
| JP | 2003-104241 A | 4/2003 |

* cited by examiner

*Primary Examiner* — Kiran B Patel
(74) *Attorney, Agent, or Firm* — Patterson Thuente Christensen Pedersen, P.A.

(57) ABSTRACT

In a present fender liner structure of a vehicle, an intake port is positioned in an upper portion of a cavity that is defined by a fender, a fender apron and a fender liner, so that air in the cavity can be introduced into an engine. A fender liner body positioned to surround a tread portion of a front wheel has a plurality of drain openings that are circumferentially formed to be positioned anterior to a center of the front wheel. The drain openings respectively have opening portions that are directed upwardly so as to have larger opening areas in a vertical direction and smaller opening areas in a longitudinal direction, and have guard portions to which muddy water splashed upwardly and passing through the opening portions can impinge.

4 Claims, 5 Drawing Sheets

FENDER LINER STRUCTURE

PRIORITY CLAIM

The present application is a National Phase entry of PCT Application No. PCT/JP2008/059219, filed May 20, 2008, which claims priority from Japanese Application Number 2007-201785, filed Aug. 2, 2007, the disclosures of which are hereby incorporated by reference herein in their entirety.

TECHNICAL FIELD

The present invention relates to a fender liner structure of a vehicle in which an intake port is positioned in an upper portion of a cavity that is defined by a fender, a fender apron and a fender liner, so that air in said cavity can be introduced into an engine.

BACKGROUND ART

Generally, in an off-road vehicle, air is introduced into an engine from an upper portion of a cavity defined by a fender, a fender apron and a fender liner, which cavity is in a relatively dust-free environment (Japanese Laid-Open Patent Publication No. 2003-104241). Therefore, from a viewpoint of preventing entry of dust, dirt or other such substances, it is not preferred that an opening is formed in the fender liner. However, the off-road vehicle or other such vehicles may sometimes travel while a bumper is immersed in water. In such a case, water can enter an inside area of the fender liner via the bumper. Therefore, if no drain opening is formed in the fender liner, the water can sometimes move upwardly along the fender liner while the vehicle is moving, so as to reach an inlet port of the engine. In order to prevent such a problem, as shown in FIG. 5 (A), a plurality of drain openings 103 are formed in a front portion of the fender liner 102.

Generally, the drain openings 103 are respectively formed in a substantially vertically extending surface and are opened so as to be horizontally forwardly directed. Therefore, each of the drain openings 103 may have an extremely small opening area when viewed in a vertical direction. As a result, muddy water or the like splashed upwardly can be effectively prevented from easily entering the inside area of the fender liner 102 via the drain openings 103.

However, because the drain openings 103 are respectively opened to be horizontally forwardly directed as described above, each of the drain openings 103 may have a larger opening area when viewed in a longitudinal direction of the vehicle. As a result, as shown in FIG. 5(B), mud or other such substances splashed forwardly via a tread portion of a front wheel T while the vehicle is moving can easily enter the inside area of the fender liner 102 via the drain openings 103. The mud or other such substances introduced into the inside area of the fender liner 102 may cause rust development in the fender. In addition, the mud or other such substances introduced into the inside area of the fender liner 102 cannot be easily removed therefrom.

Therefore, there is a need in the art to prevent the mud or other such substances splashed forwardly via the front wheel from easily entering the fender via the drain openings of the fender liner, and to prevent the muddy water splashed upwardly from reaching the inlet port of the engine via the drain openings.

SUMMARY OF THE INVENTION

A first aspect provides a fender liner structure of a vehicle in which an intake port is positioned in an upper portion of a cavity that is defined by a fender, a fender apron and a fender liner, so that air in said cavity can be introduced into an engine. A fender liner body positioned to surround a tread portion of a front wheel has a plurality of drain openings that are formed to be positioned anterior to a center of the front wheel. Said drain openings respectively have opening portions that are directed upwardly so as to have larger opening areas in a vertical direction and smaller opening areas in a longitudinal direction, and have guard portions to which water passing through said opening portions from below can impinge.

According to the present invention, because the opening portions of the drain openings are respectively directed upwardly, each of the opening portions may have the smaller opening area in the longitudinal direction. As a result, mud or other such substances splashed forwardly via the tread portion of the front wheel while the vehicle is traveling cannot easily enter an inside area of the fender liner via said opening portions.

Conversely, each of the opening portions may have the larger opening area in the vertical direction. As a result, the muddy water or the like splashed upwardly from below can easily enter the inside area of the fender liner via the opening portions. However, because the drain openings are provided with the guard portions, the muddy water or the like passing through the opening portions from below can be blocked by the guard portions. Thus, said water or the like can be prevented from moving upwardly beyond the position of the guard portions. As a result, said water or the like can be avoided from reaching the intake port positioned above.

In a second aspect, the guard portions are positioned in upper sides of the opening portions, and wherein the guard portions are inclined forwardly and upwardly such that the water passing through the opening portion can be impinged thereto and then be forwardly deflected.

In a third aspect, the upper drain openings of the drain openings have the opening portions substantially vertically directed and the guard portions are provided thereto. In addition, the lower drain openings of the drain openings have the opening portions obliquely directed upwardly and forwardly and the guard portions are omitted.

According to the present invention, the mud or other such substances splashed forwardly by the front wheel can be prevented from easily entering the fender via the drain openings of the fender liner. In addition, the water splashed upwardly can be avoided from reaching the inlet port positioned above via the drain openings.

DETAILED DESCRIPTION OF THE INVENTION

Figure 1A:
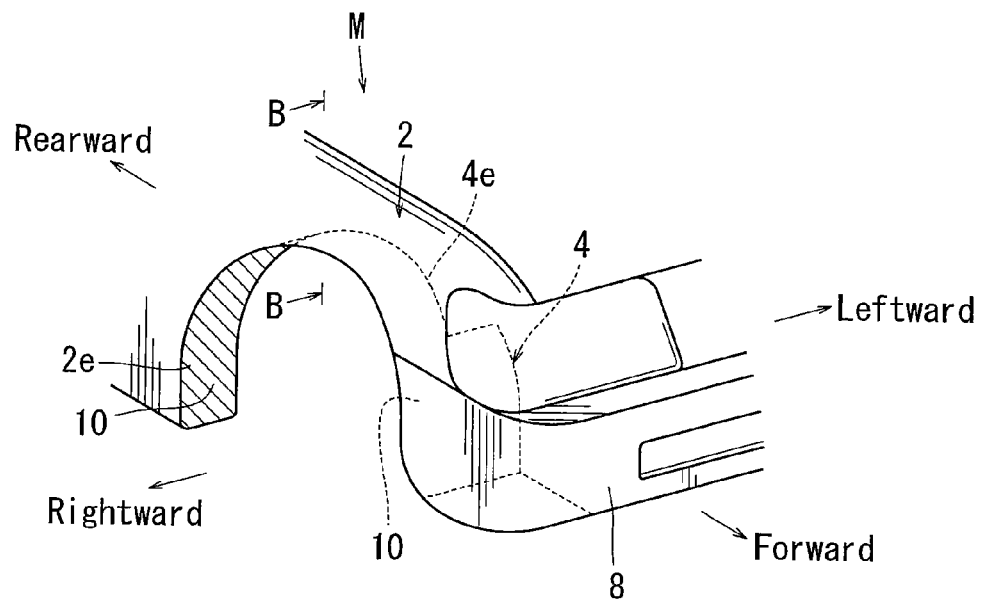
FIG. 1(A) is a front pictorial perspective view of a vehicle having a fender liner structure according to embodiment 1 of the present invention.

In the following, a fender liner structure according to embodiment 1 of the present invention will be described with reference to the drawings.

Embodiment 1

Further, forward and rearward, rightward and leftward, and upward and downward in the drawings respectively correspond to forward and rearward, rightward and leftward, and upward and downward of the vehicle.

<Regarding Outline of Front Portion of Vehicle M>

As shown in FIGS. 1(A) and (B), fenders 2 are respectively provided to side surfaces of a front portion of a vehicle M. Each of the fenders 2 can cover a front wheel T (FIGS. 3 and 4) from the outside and can form a profile of the vehicle M. Also, fender aprons 4 are provided to right and left side portions of an engine room E of the vehicle M. Each of the fender aprons 4 can cover the front wheel T from the inside.

Figure 1B:
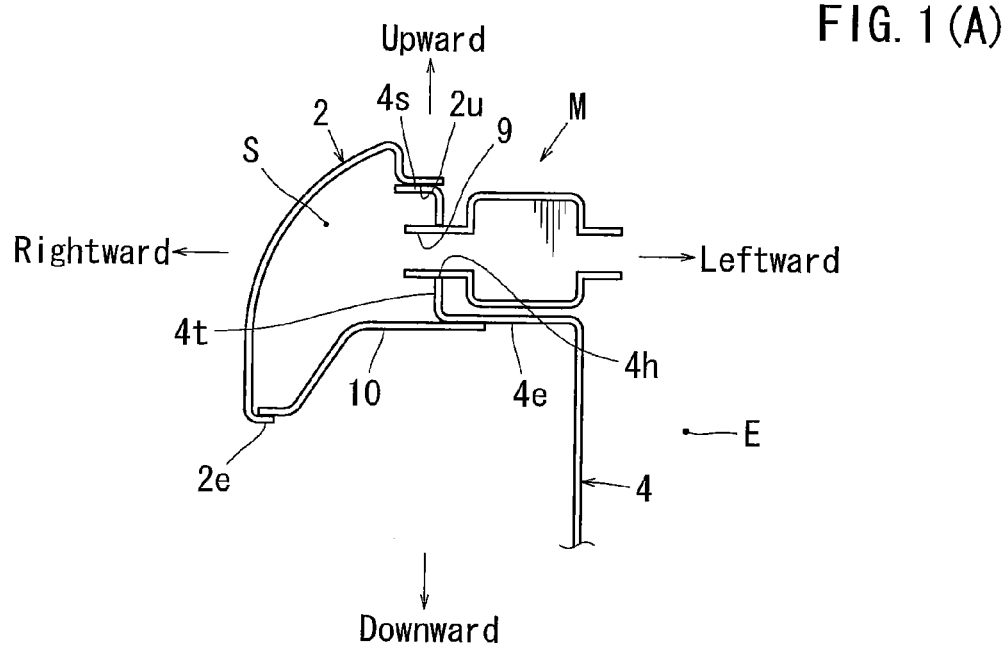
FIG. 1(B) is a cross-sectional view taken along line B-B of FIG. 1(A).

As shown in FIG. 1(B), the fender 2 is provided with an upper receiving surface 2u. The upper receiving surface 2u is formed in a lower surface of an upper periphery of the fender 2 that is bent into an L-shape. The upper receiving surface 2u is supported by an upper support surface 4s that is formed in an upper end of a vertical wall portion 4t of the fender apron 4. Further, the upper receiving surface 2u of the fender 2 and the upper support surface 4s of the fender apron 4 are bonded by welding or other such means.

Further, the fender apron 4 has a wheel cover portion 4e that can encircle a tread portion Tr (a circumferential portion) of a front wheel T. An opening formed between the wheel cover portion 4e of the fender apron 4 and a lower periphery 2e of the fender 2 is closed by a fender liner 10 that is made of, for example, resin. That is, the front portion of a vehicle M is formed with a channel-like cavity S that is defined by the fender 2, the fender apron 4 and the fender liner 10. Further, an intake port 9 of an engine is disposed on an upper portion of said cavity S. The intake port of the engine is positioned substantially directly above a center of the front wheel T and is projected into said cavity S via a through hole 4h that is formed in the vertical wall portion 4t of the fender apron.

<Regarding Fender Liner 10>

Figure 2:
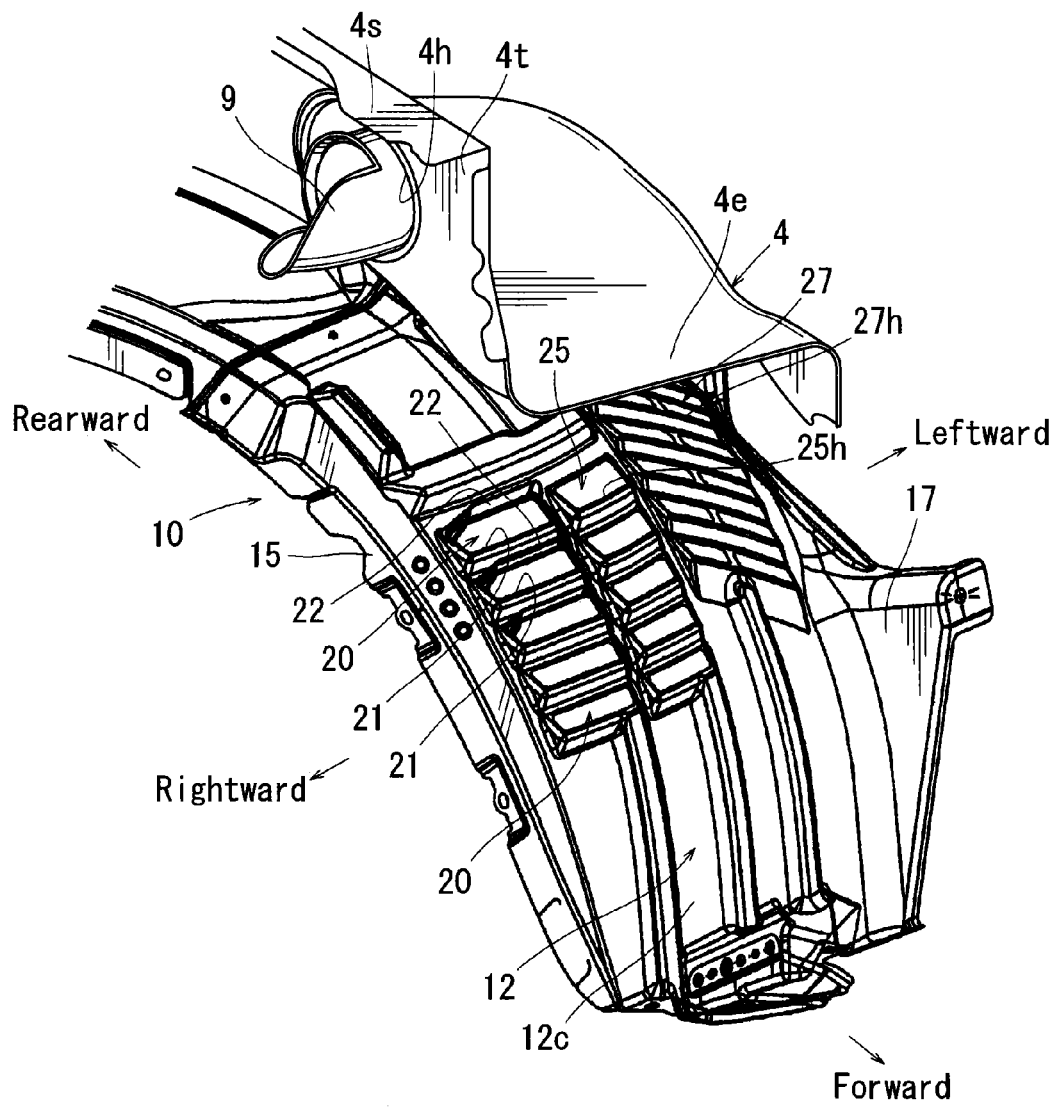
FIG. 2 is a perspective view of a fender liner of the present embodiment.

The fender liner 10 is constructed to cover the front wheel T between the wheel cover portion 4e of the fender apron 4 and the lower periphery 2e of the fender 2, and functions to prevent mud or other such substances splashed via the front wheel T from adhering to an inner surface of the fender 2. As shown in FIG. 2, the fender liner 10 is constructed of a fender liner body 12 that is positioned to surround the tread portion Tr of the front wheel T, a fender-side fixture portion 15 to be fixed to the lower periphery 2e of the fender 2, and an apron-side fixture portion 17 to be fixed to the wheel cover portion 4e of the fender apron 4. Further, in FIG. 2, the fender 2 and a lower portion of the fender apron 4 are omitted.

The fender liner body 12 is formed to have a circular arc-shape so as to follow the tread portion Tr of the front wheel T, and has a plurality of first drain openings 20, a plurality of second drain openings 25 and a plurality of third drain openings 27. The first to third drain openings 20, 25 and 27 are respectively circumferentially formed so as to be positioned anterior to a center of the front wheel T.

The first drain openings 20 are positioned in a laterally outside area of the fender liner body 12, so as to be substantially flush with the intake port 9 of the engine in a lateral direction.

Figure 3:
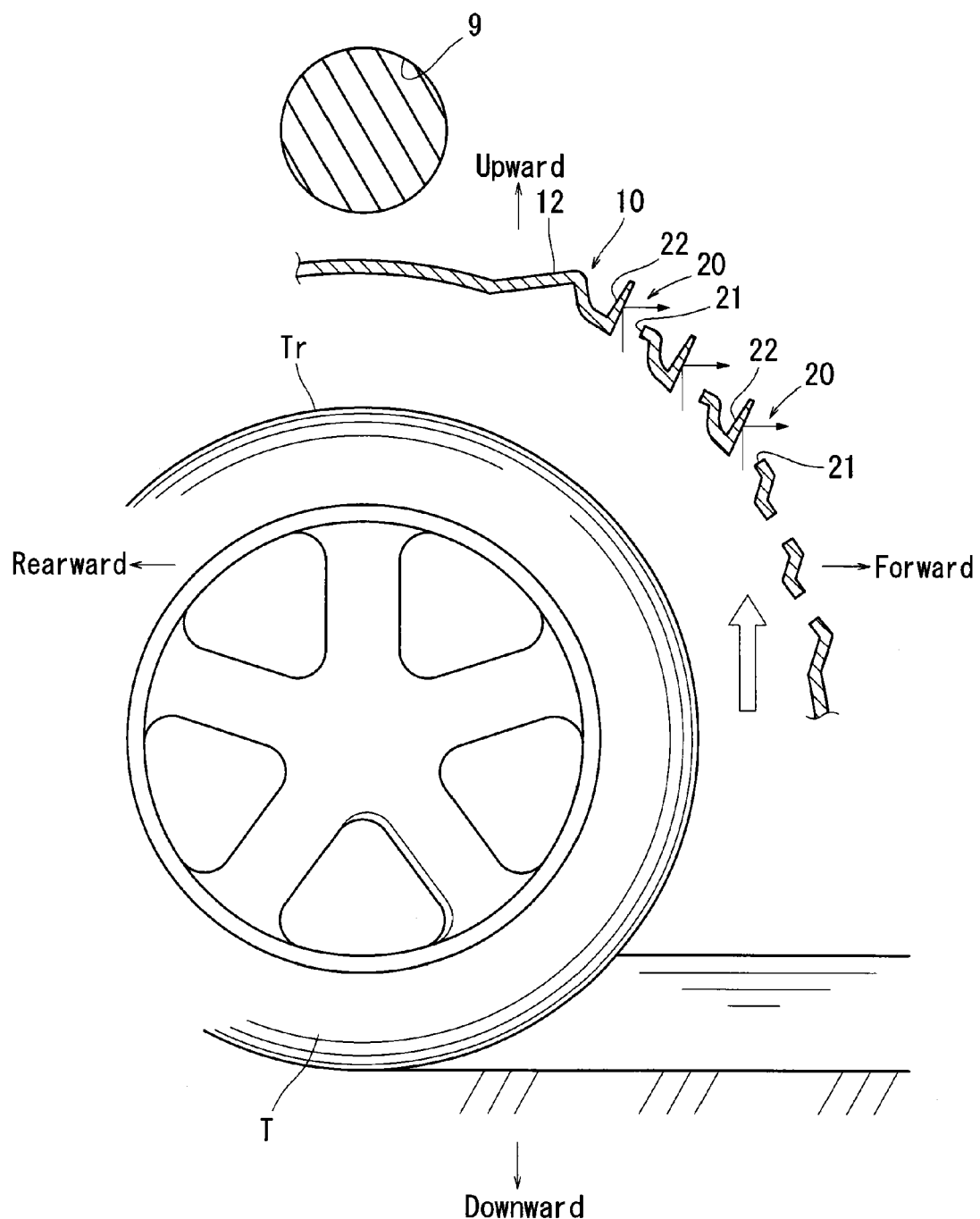
FIG. 3 is a side view illustrating an operation of the fender liner.
Figure 4:
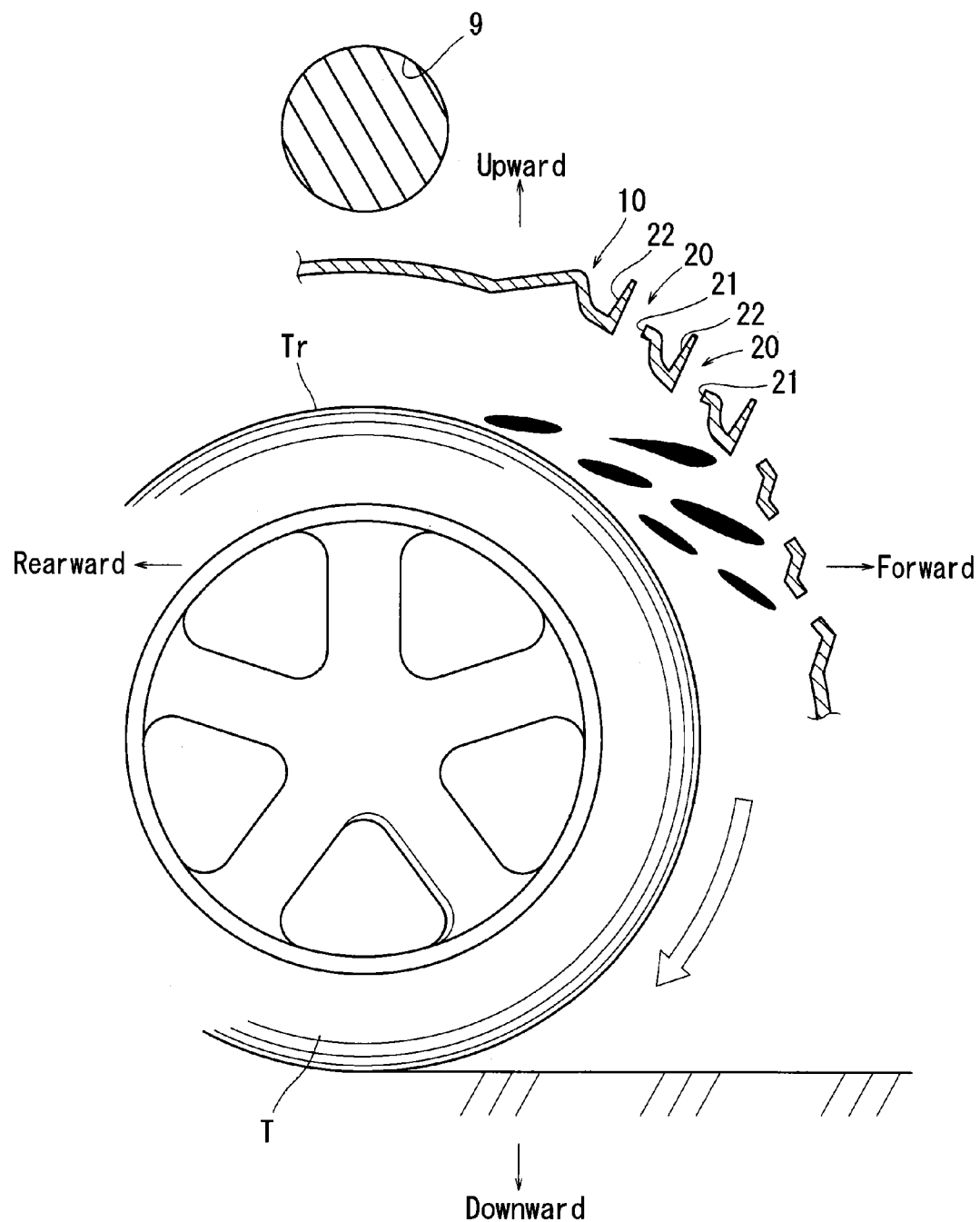
FIG. 4 is a side view illustrating the operation of the fender liner.
Figure 5:
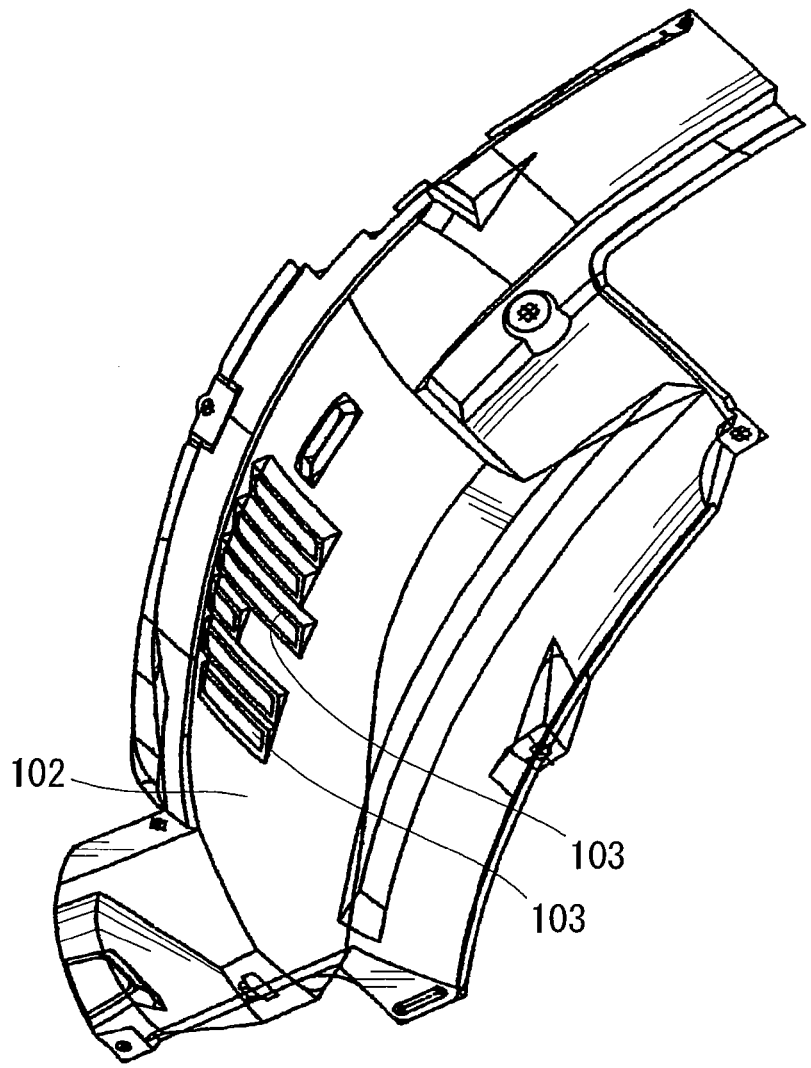
FIG. 5(A) is a perspective view of a conventional fender liner.
FIG. 5(B) is a side view illustrating an operation of the conventional fender liner.
Figure 5:
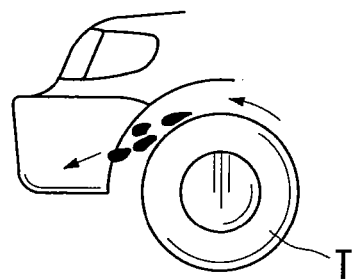

The first drain openings 20 are circumferentially formed, and the number thereof is, for example, five. As shown in FIGS. 2-4, each of the first drain openings 20 has a substantially rectangular shaped-opening portion 21 that is directed upwardly. The opening portions 21 of the upper first drain openings 20 have smaller inclination angles relative to a horizontal plane, so as to be substantially vertically directed. Conversely, the opening portions 21 of the lower first drain openings 20 have relatively greater inclination angles relative to the horizontal plane, so as to be obliquely directed upwardly and forwardly. That is, said opening portions 21 of the upper first drain openings 20 have larger opening areas in a vertical direction and smaller opening areas in a longitudinal direction.

Further, as shown in FIG. 3, each of the upper first drain openings 20 is provided with a guard portion 22 to which muddy water or the like splashed upwardly and passing through the opening portion 21 can impinge. The guard portion 22 has a planar shape identical to the opening portion 21 and is connected to an upper peripheral edge of the opening portion 21. Further, the guard portion 22 is appropriately angled so as to forwardly deflect the muddy water that is splashed upwardly and impinged to the guard portion 22. Thus, said muddy water or the like can be prevented from moving upwardly beyond a position of the guard portion 22. Therefore, the muddy water or the like can be avoided from reaching the intake port 9 of the engine.

Conversely, each of the lower first drain openings 20 is not provided with the guard portion 22. However, the lower first drain openings 20 have relatively smaller opening areas in the vertical direction and are spaced from the intake port 9 of the engine. Therefore, the muddy water or the like passing through said opening portion 21 can be avoided from reaching the intake port 9 of the engine.

As shown in FIG. 2, the second drain openings 25 are positioned in a laterally inside area that is positioned inwardly relative to the first drain openings 20 and the intake port 9 of the engine (an area below the wheel cover portion 4e of the fender apron 4). The second drain openings 25 are formed to be laterally juxtaposed to the first drain openings 20. Each of the second drain openings 25 has an upwardly directed opening portion 25h having the same shape as the first drain openings 20. Each of the second drain openings 25 is not provided with the guard portion.

The third drain openings 27 are positioned in a further laterally inside area that is positioned further inwardly relative to the second drain openings 25. The third drain openings 27 are formed to be slightly higher than the second drain openings 25. Each of the third drain openings 27 has an upwardly directed opening portion 27h that is narrower in a vertical direction and longer in a lateral direction compared with the second drain openings 25. Each of the third drain openings 27 is not provided with the guard portion.

Thus, because each of the second drain openings 25 and the third drain openings 27 is not provided with the guard portion, the muddy water or the like splashed upwardly can pass through the opening portions 25h and the opening portions 27h. However, the second drain openings 25 and the third drain openings 27 are respectively positioned in the areas that are positioned laterally inwardly relative to the intake port 9 of the engine, which areas are positioned below the wheel cover portion 4e of the fender apron 4 (FIG. 2). Therefore, the muddy water or the like splashed upwardly can be blocked by the wheel cover portion 4e, so as to be avoided from reaching the intake port 9 of the engine.

The fender liner body 12 has a bumper connecting portion 12c to which a bumper 8 (FIG. 1(A)) is connected. The bumper connecting portion 12c is positioned under the first drain openings 20, the second drain openings 25 and the third drain openings 27.

<Regarding Function of Fender Liner 10>

Next, function of said fender liner 10 will be described.

First, when the vehicle M travels while the bumper 8 is immersed in water, water can enter an inside area of the fender liner 10 (an inside area of the fender 2) via an opening (not shown) of the bumper 8. The water can move backwardly and upwardly along the fender liner 10 while the vehicle M is moving. However, the fender liner 10 has the first drain openings 20, the second drain openings 25 and the third drain openings 27 that are positioned anterior to the front wheel T. Therefore, the water entering the inside area of the fender liner 10 and moving upwardly can be drained via the first drain openings 20, the second drain openings 25 and the third drain openings 27. As a result, the water entering the inside area of the fender liner 10 is not capable of reaching the intake port 9 of the engine.

Also, even if the mud or other such substances splashed forwardly via the tread portion Tr of the front wheel T while the vehicle M is traveling on a dirt road or other such road, because the opening portions 21, 25h and 27 of the first to third drain openings 20, 25 and 27 are respectively directed upwardly, each of the opening portions 21, 25h and 27h may have the smaller opening area in the longitudinal direction. As a result, as shown in FIG. 4, the mud or other such substances splashed forwardly via the tread portion Tr of the front wheel T cannot easily enter the inside area of the fender liner 10 via the opening portions 21, 25h and 27h.

Further, the first drain openings 20 are provided with the guard portions 22. Therefore, as shown in FIG. 3, even if the muddy water is splashed upwardly when the front wheel T falls into a puddle while the vehicle M is traveling, the muddy water or the like passing through the opening portion 21 can impinge to the guard portion 22, so as to be deflected forwardly therefrom. Thus, said muddy water or the like can be prevented from moving upwardly beyond the position of the guard portion 22. As a result, the muddy water or the like can be avoided from reaching the intake port 9 of the engine.

As previously described, each of the lower first drain openings 20 is not provided with the guard portion 22. However, the lower first drain openings 20 have the relatively smaller opening areas in the vertical direction and are spaced from the intake port 9 of the engine. Therefore, the muddy water or the like passing through said opening portion 21 can be avoided from reaching the intake port 9 of the engine.

Moreover, because each of the second drain openings 25 and the third drain openings 27 is not provided with the guard portion, the muddy water or the like splashed upwardly can pass through the opening portions 25h and the opening portions 27h. However, the second drain openings 25 and the third drain openings 27 are respectively positioned in the areas that are positioned laterally inwardly relative to the intake port 9 of the engine. Therefore, the muddy water or the like splashed upwardly can be avoided from reaching the intake port 9 of the engine.

<Regarding Advantages of Fender Liner Structure According to Present Embodiment>

According to the fender liner structure according to the present embodiment, because the opening portions 21, 25h and 27h of the drain openings 20, 25 and 27 are respectively directed upwardly, each of the opening portions 21, 25h and 27h may have the smaller opening area in the longitudinal direction. As a result, the mud or other such substances splashed forwardly via the tread portion Tr of the front wheel T while the vehicle M is traveling cannot easily enter the inside area of the fender liner 10 via the opening portions 21, 25h and 27h.

Conversely, each of the opening portions 21, 25h and 27h may have the larger opening area in the vertical direction. As a result, the muddy water or the like splashed upwardly can easily enter the inside area of the fender liner 10 via the opening portions 21, 25h and 27h. However, because the drain openings 20 are provided with the guard portions 22, the muddy water or the like splashed upwardly and passing through the opening portion 21 can be blocked by the guard portion 22. Thus, said muddy water or the like can be prevented from moving upwardly beyond the position of the guard portion 22. As a result, said muddy water or the like can be avoided from reaching the intake port 9 of the engine.

<Modified Forms of Vehicle Seat 1>

The present invention is not limited to the embodiment described above and the invention can be modified without departing from the scope thereof. For example, in this embodiment, the first drain openings 20 are provided with the guard portions 22, and the second and third drain openings 25 and 27 are not provided with the guard portions. However, the second and third drain openings 25 and 27 can additionally be provided with the guard portions.

Also, in the embodiment, only the upper first drain openings 20 are provided with the guard portions 22, and the lower first drain openings 20 are not provided with the guard portions 22. However, all of the first drain openings 20 can respectively be provided with the guard portions 22.

Further, in the embodiment, the number of each of the first to third drain openings 20, 25 and 27 is five. However, the number of each of the first to third drain openings 20, 25 and 27 can be changed, if necessary.

The invention claimed is:

1. A fender liner structure of a vehicle in which an intake port is positioned in an upper portion of a cavity that is defined by a fender, a fender apron and a fender liner, so that air in said cavity can be introduced into an engine,
    wherein a fender liner body positioned to surround a tread portion of a front wheel has a plurality of drain openings that are formed to be positioned anterior to a center of the front wheel,
    wherein said drain openings respectively have opening portions that are directed upwardly so as to have larger opening areas in a vertical direction and smaller opening areas in a longitudinal direction, and have guard portions to which water passing through said opening portions from below can impinge.

2. The fender liner structure as defined in claim 1, wherein the guard portions are positioned in upper sides of the opening portions, and wherein the guard portions are inclined forwardly and upwardly such that the water passing through said opening portion can be impinged thereto and then be forwardly deflected.

3. The fender liner structure as defined in claim 1, wherein the upper drain openings of the drain openings have the opening portions substantially vertically directed and the guard portions are provided thereto, and wherein the lower drain openings of the drain openings have the opening portions obliquely directed upwardly and forwardly and the guard portions are omitted.

4. The fender liner structure as defined in claim 2, wherein the upper drain openings of the drain openings have the opening portions substantially vertically directed and the guard portions are provided thereto, and wherein the lower drain openings of the drain openings have the opening portions obliquely directed upwardly and forwardly and the guard portions are omitted.

* * * * *